United States Patent [19]

Tortorello et al.

[11] Patent Number: 4,659,768

[45] Date of Patent: Apr. 21, 1987

[54] THERMOSETTING FLUOROCARBON POLYMER COATINGS

[75] Inventors: Anthony J. Tortorello, Des Plaines; Clark A. Higginbotham, Crystal Lake, both of Ill.

[73] Assignee: DeSoto, Inc., Des Plaines, Ill.

[21] Appl. No.: 825,593

[22] Filed: Feb. 3, 1986

[51] Int. Cl.$^4$ .............................................. C08L 61/00
[52] U.S. Cl. ................................... 524/512; 525/155; 525/158
[58] Field of Search ................ 524/512; 525/155, 158

[56] References Cited

U.S. PATENT DOCUMENTS

| | | | |
|---|---|---|---|
| 4,022,737 | 5/1977 | Sekmakas et al. | 525/162 |
| 4,065,425 | 12/1977 | Bussell et al. | 524/512 |
| 4,273,695 | 6/1981 | Greene et al. | 524/512 |
| 4,314,004 | 2/1982 | Stoneberg | 427/407.1 |
| 4,338,379 | 7/1982 | Strolle et al. | 524/512 |
| 4,340,511 | 7/1982 | Backhouse et al. | 524/512 |
| 4,383,075 | 5/1983 | Abel | 524/512 |
| 4,503,097 | 3/1985 | Higaki et al. | 524/512 |
| 4,554,319 | 11/1985 | Heaps et al. | 524/512 |

*Primary Examiner*—Joseph L. Schofer
*Assistant Examiner*—N. Sarofim
*Attorney, Agent, or Firm*—Dressler, Goldsmith, Shore, Sutker & Milnamow, Ltd.

[57] ABSTRACT

There is disclosed a thermosetting solvent solution coating composition comprising volatile organic solvent having dissolved therein at least about 45% of a fluorocarbon polymer together with at least about 10% of a hydroxy-functional organic soluble copolymer of from 3% to 8% of 2-hydroxyethyl acrylate, balance consisting essentially of nonreactive monoethylenically unsaturated monomers, and an aminoplast curing agent in an amount to cure the hydroxy-functional copolymer, These coatings exhibit improved water spot resistance and minimum color change and gloss reduction on exterior exposure.

12 Claims, No Drawings

THERMOSETTING FLUOROCARBON POLYMER COATINGS

DESCRIPTION

1. Technical Field

This invention relates to solvent solution coating compositions containing fluorocarbon polymer in combination with a thermosetting acrylic system.

2. Background Art

Solvent solution coating compositions containing fluorocarbon polymers, and especially polyvinylidene fluoride homopolymer, in combination with acrylic copolymers are known. In some of these coating compositions, thermoplastic acrylic copolymers were used in the absence of any curing agent, and the product properties were less than desired. More particularly, on exterior exposure the baked coatings tend to water spot, especially on surfaces which are not vertical. Also, the coatings were attacked by organic solvent. Solution coatings of this type are disclosed in U.S. Pat. No. 4,314,004 issued Feb. 2, 1982 to Richard L. Stoneberg and assigned to PPG Industries, Inc.

It is found that these inadequacies are minimized by using thermosetting acrylic copolymers and thermosetting systems involving acrylic copolymers, but while these provide improved coating properties, the thermoset coatings have been inadequate in several respects. More particularly, they tend to change color and lose gloss on extended exterior exposure, and these inadequacies are noted by dew cycle weatherometer exposure which speeds the deterioration of the coatings.

Particularly satisfactory thermosetting acrylic copolymer systems were previously based on copolymers containing 2-hydroxyethyl methacrylate in combination with aminoplast curing agent, but these possessed the inadequacies noted above, and also possessed excessive solution viscosity which forced a decrease in the solids content of the applied coatings. The usual proportion of 2-hydroxyethyl methacrylate was about 15%. It is desired to increase the solids content of the coating compositions which are applied while further enhancing the product quality which is obtained in the cured coatings.

DISCLOSURE OF INVENTION

In this invention, a thermosetting solvent solution coating composition comprises volatile organic solvent having dissolved therein at least about 45% of a fluorocarbon polymer, especially a polyvinylidene fluoride copolymer, together with at least about 10% of an hydroxy-functional organic solvent-soluble copolymer containing from 3% to 8% of 2-hydroxyethyl acrylate, preferably from 4% to 6%, balance consisting essentially of nonreactive monoethylenically unsaturated monomers, and an aminoplast curing agent in an amount to cure said hydroxy-functional copolymer. These coating compositions may be pigmented or clear, clear topcoats being primarily contemplated.

The above proportions are by weight based on the total weight of resin solids (which includes the curing agent), and all ratios and proportions herein including the accompanying claims are by weight, unless otherwise stated.

The fluorocarbon polymer is preferably a homopolymer of vinylidene fluoride, i.e., polyvinylidene fluoride, but one may also employ copolymers of vinylidene fluoride containing a major proportion of vinylidene fluoride. These copolymers desirably contain at least 95 mol percent of the vinylidene fluoride. Suitable comonomers are the halogenated ethylenes, such as symmetrical dichlorodifluoroethylene, 1,1-2-trifluoro-2-chloroethylene, tetrafluoroethylene, vinyl chloride, vinyl acetate, and others. While vinylidene fluoride is the preferred fluorocarbon polymer, the corresponding vinyl fluoride homopolymer and copolymers are also useful.

Preferred proportions of the fluorocarbon polymer are from about 70% to about 80%.

The hydroxy-functional solution copolymer is the copolymer produced by solution copolymerization in the presence of free-radical polymerization initiator of monoethylenically unsaturated monomers including the required proportion of 2-hydroxyethyl acrylate. The other monomers are preferably acrylic esters and methacrylic esters with alcohols containing from 1 to 12 carbon atoms, preferably from 1 or 2 carbon atoms. Most preferably, the other monomers consist of at least 50% of methyl methacrylate and the balance ethyl acrylate, most preferably from 55% to 65% methyl methacrylate, balance ethyl acrylate. Small amounts, up to about 1%, of a carboxylic acid, like acrylic acid or methacrylic acid, may be tolerated.

The hydroxy copolymer is preferably used in an amount of from 15% to 30%, most preferably from 21% to 25%.

The aminoplast curing agent is simply a formaldehyde condensate with an amine, preferably melamine, to provide a heat-hardening methylol-functional resin. While many aminoplast resins are broadly useful, such as urea formaldehyde condensates and benzoguanamine formaldehyde condensates, it is preferred that the aminoplast resin be a polyalkoxymethyl melamine resin in which the alkoxy group contains from 1-4 carbon atoms. Appropriate melamine-formaldehyde condensates are readily available in commerce and are usually etherified with lower alcohols for use in organic solvent solution, as is well known.

The aminoplast resin is desirably used in an amount of from 3% to 20% of total resin solids, preferably in an amount of from 4% to 10% of total resin solids.

The resin components which have been described are employed herein in solvent solution. Various volatile solvents are commonly used, such as methyl ethyl ketone, toluene, xylene, dipropylene glycol monoacetate, butyl acetate, and the like. Solvent selection is of secondary significance in this invention.

Pigments are usually absent, but one can add minor proportions of inorganic pigments, such as titanium dioxide, or corrosion-resistant pigments which are typically chromate pigments, such as strontium chromate.

While acidic catalysts may be present, they are not needed herein because the baking temperatures used to fix the fluorocarbon polymer to the prime-coated aluminum substrates is quite high, so the N-methylol cure of the hydroxy-functional copolymer is adequate to provide a solvent-resistant film in the absence of added catalyst.

The invention is illustrated as follows:

Resin Synthesis

Control Resin

A 5-liter, 4-neck flask is equipped with mechanical stirrer, thermometer, reflux condenser, and separate inlet lines for nitrogen and monomer feed. 199 grams of xylene and 736 grams of 2-ethoxyethyl acetate are introduced into the flask and heated to 135° C. under a nitrogen atmosphere.

A monomer solution is prepared in a separate container by adding, with mixing, 595 grams of 2-ethoxyethyl acetate, 169 grams of xylene, 1316 grams of methyl methacrylate, 431 grams of ethyl acrylate, 308 grams of 2-hydroxyethyl methacrylate, 7.6 grams of di-tertiary butyl peroxide, and 8.6 grams of benzoyl peroxide.

When the solvent mixture in the flask reaches 135° C., addition of the monomer solution is begun. The mixture is added continuously over a 3-hour period under a nitrogen atmosphere with agitation, and the temperature is thermostatted to maintain 135°±2° C. After addition is complete, the resulting polymer solution is stirred at 135° C. for an additional 2 hours to convert most of the monomers to copolymer.

To the copolymer solution is then added 3.8 grams of tertiary butylperbenzoate and the mixture is stirred at 135° C. for 2 hours. Following this time, an additional 2.9 grams of tertiary butylperbenzoate is added and the solution is stirred at 135° C. for another 2 hours. The resulting clear copolymer solution is then cooled and poured into a suitable container.

The properties of the copolymer solution are as follows: 55±1 percent nonvolatile materials; Z6–Z7 Gardner viscosity; 1–2 Gardner color; 60±3 mg. KOH per resin gram hydroxyl value.

Experimental Resin

A 5-liter, 4-neck flask is equipped with mechanical stirrer, thermometer, refulux condenser and separate inlet lines for nitrogen, monomer feed and initiator feed. 154 grams of xylene and 1256 grams of Dowanol BC-300 (Dow Chemical Co.) are added to the flask, and these solvents are heated to 125° C. under a nitrogen atmosphere.

During this time, a mixture of 1323 grams of methyl methacrylate, 473 grams of ethyl acrylate, and 94 grams of 2-hydroxyethyl acrylate is prepared in a separate container. In another container, an initiator solution is prepared by adding 38 grams of tertiary butylperbenzoate to 200 grams of xylene.

When the solvent mixture in the flask reaches 125° C., addition of monomers and initiator solutions from separate feed streams is begun. The additions are made to occur continuously over 3 hours with agitation under a nitrogen atmosphere, and the temperature is maintained at 125±2° C. After addition is complete, the resulting copolymer solution is stirred at 125° C. for an additional hour. After this time period, 4 grams of tertiary butylperbenzoate is added and the solution is mixed for an additional hour. The solution is finally cooled and poured into a suitable container.

Solution properties are recorded as follows: 54±1 percent non-volatile materials; Y-Z1 Gardner viscosity; 1–2 Gardner color; 23±3 mg KOH per resin gram hydroxyl value.

Examples of improved performance of fluorocarbon polymer solutions utilizing the experimental acrylic copolymer in place of the control acrylic copolymer has been demonstrated in both clear and pigmented topcoats. Using the experimental acrylic copolymer in place of the control acrylic copolymer results in improved dew cycle weatherometer performance and increased solids at equivalent hardness, chemical resistance and formability. Comparison of the experimental acrylic copolymer in place of an all thermoplastic system, results in a higher solids content in the experimental system and equivalent dew cycle weatherometer performance.

More particularly, a clear polyvinylidene fluoride solution coating composition was formulated to contain 70% of polyvinylidene fluoride polymer, 24% copolymer and 6% of an aminoplast curing agent. Two aminoplast curing agents were used, namely: Resimene 740 from Monsanto and Cymel 303 from American Cyanamid Company. This clear coating was applied over a dark bronze polyvinylidene fluoride undercoating and the overcoated products were baked for 30 seconds to a peak metal temperature of 480° F.

Using the control copolymer in combination with Resimene 740, the change in color was 6.7 units and only 56% of the gloss was retained. Using the experimental copolymer with Resimene 740, the color change was much smaller (0.8 units) and 71% of the gloss was retained.

Similar results were obtained using Cymel 303 as the aminoplast curing agent, but this aminoplast was less satisfactory. After the stated exposure using the control copolymer, the color change was 22.6 units and only 41% of the gloss was retained. Using the experimental resin, the color change was much smaller (4.7 units) and 50% of the gloss was retained.

Using a thermoplastic system, the gloss and gloss retention was about the same as using the experimental resin, namely: the color change was small (1.1 units) and 70% of the gloss was retained. However, the water spot resistance of the thermoplastic system was not as good as that of the thermosetting system.

Using slightly different proportions, namely: 70% polyvinylidene fluoride polymer, 22% acrylic copolymer and 5% Resimene 740, the solution viscosity is consistently lower with the experimental resin, so it can be formulated at higher solids content. After baking as previously described over the same dark bronze undercoating and exposing for 400 hours in the dew cycle weatherometer, the control copolymer changed color 4.6 units and retained only 9% of its gloss, but the experimental copolymer changed color only 1.4 units and retained 63% of its gloss.

Varying the above test by using 50% polyvinylidene fluoride polymer, 40% acrylic copolymer and 10% Resimene 740, the solution viscosity was again lower with the experimental resin. After baking as previously described over the same dark bronze undercoating and exposing for 400 hours in the dew cycle weatherometer, the control copolymer changed color 6.6 units and retained only 17% of its gloss, but the experimental copolymer changed color only 1.8 units and retained 34% of its gloss.

The color units referred to above are standard in the measurement of color changes on exposure, and denote the root mean square of the L, a, and b values in a Hunter colorimeter measurement device (D25).

What is claimed is:

1. A thermosetting solvent solution coating composition comprising volatile organic solvent having dissolved therein at least about 45% of a fluorocarbon polymer together with at least about 10% of an hydroxy-functional organic soluble copolymer of from 3% to 8% of 2-hydroxyethyl acrylate, balance consisting essentially of nonreactive monoethylenically unsaturated monomers, and an aminoplast curing agent in an amount to cure said hydroxy-functional copolymer, said proportions being by weight based on the total weight of resin solids.

2. A coating composition as recited in claim 1 which is unpigmented.

3. A coating composition as recited in claim 1 in which said fluorocarbon polymer is polyvinylidene fluoride homopolymer.

4. A coating composition as recited in claim 1 in which said aminoplast resin is present in an amount of from 3% to 20%.

5. A coating composition as recited in claim 4 in which said fluorocarbon polymer is present in an amount of from about 70% to about 80%.

6. A coating composition as recited in claim 5 in which said acrylic copolymer is present in an amount of from about 15% to about 30%.

7. A coating composition as recited in claim 6 in which said nonreactive monomers consist of acrylic acid and methacrylic acid esters with $C_1$-$C_{12}$ alcohols.

8. A coating composition as recited in claim 7 in which said nonreactive monomers include at least 50% of methyl methacrylate.

9. A coating composition as recited in claim 7 in which said methyl methacrylate is present in an amount of from 55% to 65%, and the balance of the copolymer is ethyl acrylate.

10. A coating composition as recited in claim 1 in which said aminoplast resin is a polyalkoxymethyl melamine present in an amount of from 4% to 10%.

11. An unpigmented thermosetting solvent solution coating composition comprising volatile organic solvent having dissolved therein from about 70% to about 80% of polyvinylidene homopolymer together with from about 15% to about 30% of an hydroxy-functional organic soluble copolymer of from 3% to 8% of 2-hydroxyethyl acrylate, balance acrylic acid and methacrylic acid esters with $C_1$-$C_{12}$ alcohols, and from 3% to 20% of an aminoplast curing agent, said proportions being by weight based on the total weight of resin solids.

12. A coating composition as recited in claim 11 in which said acrylic esters include at least 50% of methyl methacrylate, and said aminoplast resin is a polyalkoxymethyl melamine present in an amount of from 4% to 10%.

* * * * *